United States Patent [19]
Suzuki

[11] Patent Number: 5,228,768
[45] Date of Patent: Jul. 20, 1993

[54] VEHICULAR HEADLAMP HAVING INCLINATION MEASURING UNIT

[75] Inventor: Yoshio Suzuki, Shizuoka, Japan

[73] Assignee: Koito Manufacturing Co., Ltd., Tokyo, Japan

[21] Appl. No.: 804,419

[22] Filed: Dec. 10, 1991

[30] Foreign Application Priority Data

Dec. 27, 1990 [JP] Japan .................. 2-407818

[51] Int. Cl.$^5$ .................. B60Q 1/04; F21M 3/20
[52] U.S. Cl. .................. 362/66; 362/80; 362/273; 362/289; 362/428
[58] Field of Search .............. 362/61, 66, 80, 273, 362/275, 287, 289, 420, 421, 427, 428

[56] References Cited

U.S. PATENT DOCUMENTS

| | | | |
|---|---|---|---|
| 4,333,131 | 6/1982 | Hujimoto | 362/80 |
| 4,916,586 | 4/1990 | Van Duyn et al. | 362/80 |
| 5,032,964 | 7/1991 | Endo et al. | 362/66 |
| 5,063,480 | 11/1991 | McMahan et al. | 362/66 |
| 5,065,293 | 11/1991 | Mochizuki | 362/273 |
| 5,068,769 | 11/1991 | Umeda et al. | 362/61 |
| 5,138,542 | 8/1992 | Daumueller et al. | 362/66 |

FOREIGN PATENT DOCUMENTS 2379402  10/1978  France ..................... 362/289

Primary Examiner—Ira S. Lazarus
Assistant Examiner—Y. Quach
Attorney, Agent, or Firm—Sughrue, Mion, Zinn, Macpeak & Seas

[57] ABSTRACT

A vehicular headlamp which includes an inclination measuring unit provided between an aiming screw and the reference member of the headlamp (the lamp body in the case of a movable reflector type headlamp and the lamp housing in the case of a movable unit type headlamp), which is simple in construction and easy to adjust. The inclination measuring unit is provided between the reference member and a straight portion on a rear end portion of the aiming screw, which is threadably engaged with the reference member. The inclination measuring unit includes a guide member extending substantially parallel to the aiming screw, a slide member supported on the straight portion and slidably coupled to the guide member, and a scale provided on the guide member or slide member for indicating an amount of displacement of the inclination member, thereby to measure the inclination of the latter.

12 Claims, 7 Drawing Sheets

VEHICULAR HEADLAMP HAVING INCLINATION MEASURING UNIT

BACKGROUND OF THE INVENTION

The present invention relates to a headlamp for a motor vehicle, which headlamp is provided with an inclination measuring unit for determining whether or not the direction of irradiation of the headlamp, that is, the angle of irradiation of the headlamp in horizontal and vertical planes, is correct. More particularly, the invention relates to an inclination measuring unit for a vehicular headlamp with which the angle of irradiation of the lamp can be corrected with ease.

By way of example, a movable reflector type headlamp will be described in which a reflector is tiltably supported in a lamp body. As shown in FIG. 6, the rear wall of the reflector 202 is supported at three points on the lamp body 201, namely, by two aiming screws 203 and 204 extending in the axial direction of the headlamp and by a swinging fulcrum 205. (Since FIG. 6 is a front view of the reflector, the aiming screws 203 and 204 extend perpendicular to the surface of the drawing.)

More specifically, the aiming screws 203 and 204 are threadably rotatably supported on the rear wall of the lamp body 201. The reflector supporting points of the aiming screws 203 and 204 are arranged so that two straight lines connecting the supporting points and the swinging fulcrum 205 form right angles, for instance. The aiming screws 203 and 204 are turned to swing the reflector 202 about the horizontal axis $L_x$ and the vertical axis $L_y$, respectively, thereby to adjust the angle of irradiation of the headlamp. In FIG. 6, reference numeral 206 designates a light source, namely, a light bulb mounted in the reflector 202.

On the other hand, a movable unit type headlamp (not shown) is also known in which a lamp-body reflector unit is tiltably supported on a lamp housing. In this case, the reflector is integrally formed on the inner wall of the lamp body. In the movable unit type headlamp, similarly as in the movable reflector type headlamp shown in FIG. 6, the unit is supported on the lamp housing with one swinging fulcrum and two aiming screws. The aiming screws are turned to tilt the unit, thereby to adjust the angle of irradiation of the headlamp.

That is, by turning the two aiming screws, an inclination member (the reflector in the case of the movable reflector type headlamp and the lamp-body reflector in the case of the movable unit type headlamp), which incorporates a light reflecting surface which determines the direction of irradiation of the headlamp, is swung vertically (or about the horizontal axis) and horizontally (or about the vertical axis) with respect to a reference member (the lamp body in the case of the movable reflector type headlamp and the lamp housing in the case of the movable unit type headlamp), thereby to adjust the angle of irradiation of the headlamp.

Recently, a variety of arrangements for measuring the angle of irradiation of a headlamp in the horizontal plane have been proposed in the art, examples of which are disclosed in commonly assigned Japanese Patent Application No. 154630/1988 and Japanese Utility Model Applications Nos. 98397/1988, 121576/1988 and 43979/1989.

However, the measuring devices disclosed in these applications are disadvantageous in the following points: First, a measuring unit for measuring the amount of inclination in the horizontal plane of the inclination member is provided between the inclination member and the reference member, positioned on the upper portion of the headlamp so as to facilitate the reading of the indication. Accordingly, the resultant headlamp is relatively large in height, which militates against the recent tendency to reduce the height of a headlamp as much as possible. Particularly, in the movable reflector type headlamp, with the measuring unit arranged in the lamp body, it is rather inconvenient to read the indication displayed on the measuring unit.

In the aforementioned Japanese Patent Application No. 154630/1988 there is proposed a measuring unit having a scale section protruding rearward of the reference member. However, the measuring unit is still disadvantageous in that it is necessary to form holes in the reference member to mount the measuring unit, which is troublesome. In addition, the adjustment of the measuring unit when coupled to the headlamp is difficult.

SUMMARY OF THE INVENTION

In view of the foregoing, an object of the invention is to provide an inclination measuring unit for a vehicular headlamp which makes it unnecessary to modify the reference member to mount the measuring unit, and which can be mounted on portions of aiming screws which extend rearward of the reference member, thereby allowing a reduction of the height of the headlamp.

The foregoing and other objects of the invention have been achieved by the provision of an inclination measuring unit for a vehicular headlamp which is designed as follows:

In a vehicular headlamp of the movable inclination member type, an inclination member with a light reflecting surface determining the direction of irradiation of the lamp is supported at three points, namely, by one swinging fulcrum supported on a reference member and a horizontal aiming screw and a vertical aiming screw arranged in such a manner as to penetrate the reference member along the horizontal axis of the headlamp and supported by the reference member. The horizontal and vertical aiming screws are turned to adjust the inclination of the inclination member in a horizontal plane and in a vertical plane, respectively, thereby to adjust the angle of inclination of the headlamp. The aiming screws are threadably engaged with female-threaded members provided on the side of the reference member, and supporting portions, each of which comprises a ball joint, support the inclination member. In accordance with the invention, an inclination measuring unit is provided between the reference member and the rear end portion of each of the aiming screws which protrudes rearward of the reference member.

The inclination measuring unit comprises: a guide member which is supported by the reference member and extends substantially parallel to the rear end portion of the aiming screw protruding rearward of the reference member; a slide member supported on a straight portion forming a part of the rear end portion of the aiming screw, the slide member being coupled to the guide member in such a manner that the slide member is slidable back and forth along the guide member; and a scale provided on one of the guide member and the slide member for indicating an amount of displacement of the inclination member with respect to the reference member.

In the inclination measuring unit of the invention, the slide member is coupled to the guide member, which is preferably threadably engaged with the reference member in such a manner that the slide member is rotatable relative to the guide member, and the guide member is turned to perform zero point adjustment of the scale.

In the case of a movable unit type headlamp, the reference member is a lamp housing and the inclination member is a lamp-body reflector unit comprising a lamp body and a reflector formed integrally on the inner surface of the lamp body. On the other hand, in the case of a movable reflector type headlamp, the reference member is a lamp body and the inclination member is a reflector which can be tilted inside the lamp body.

As each of the aiming screws is turned, it is moved back and forth with respect to the female-threaded member provided on the side of the reference member, as a result of which the inclination member is inclined with respect to the reference member (or turned about the central axis of inclination) while the slide member is slid back and forth along the guide member. When the aiming screw is turned, the resultant amount of inclination of the inclination member with respect to the reference member (i.e., the amount of forward or backward movement of the point where the inclination member is supported by the aiming screw) is proportional to the amount of movement of the slide member with respect to the guide member. Hence, the deviation in inclination of the inclination member with respect to the reference member, that is, the deviation in the angle of irradiation of the headlamp, is indicated on the scale as an amount of shift of the slide member. Hence, it can be determined from the indication on the scale whether or not the angle of irradiation of the headlamp is correct. When not correct, the amount of deviation from the correct value can be read from the indication on the scale, and the angle of irradiation of the lamp head can be adjusted by turning the aiming screw until the amount of shift is zeroed.

Inclination measuring units comprising a guide member and a slide member are provided between the reference member and the straight portion forming a part of the rear end portion of each of the aiming screw protruding rearward of the reference member. With this arrangement, it is unnecessary to machine the reference member to install the inclination measuring unit.

In addition, since the inclination measuring unit is provided behind the reference member, the resultant headlamp is low in height.

In the inclination measuring unit of the invention where the slide member is coupled to the guide member, which is threadably engaged with the reference member in such a manner that the guide member is rotatable relative to the slide member, and the guide member is turned to perform zero point adjustment of the scale, the guide member can be turned so that it is moved back and forth relative to the slide member to achieve zero point adjustment of the scale.

DESCRIPTION OF THE PREFERRED EMBODIMENTS

Preferred embodiments of the invention will be described with reference to the accompanying drawings.

Figure 1:
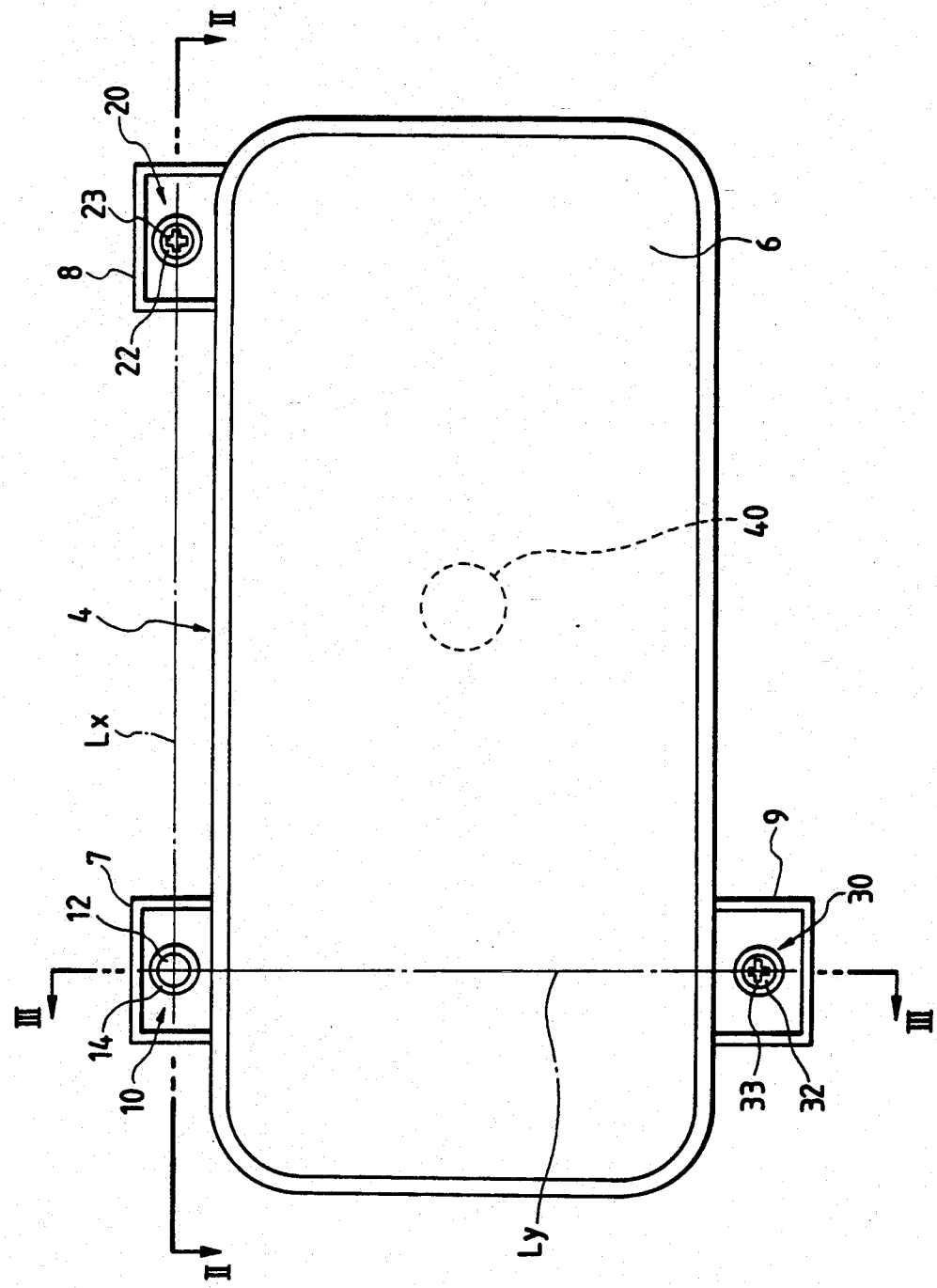
FIG. 1 is a front view of a movable unit type headlamp to which the technical concept of the invention is applied.
Figure 2:
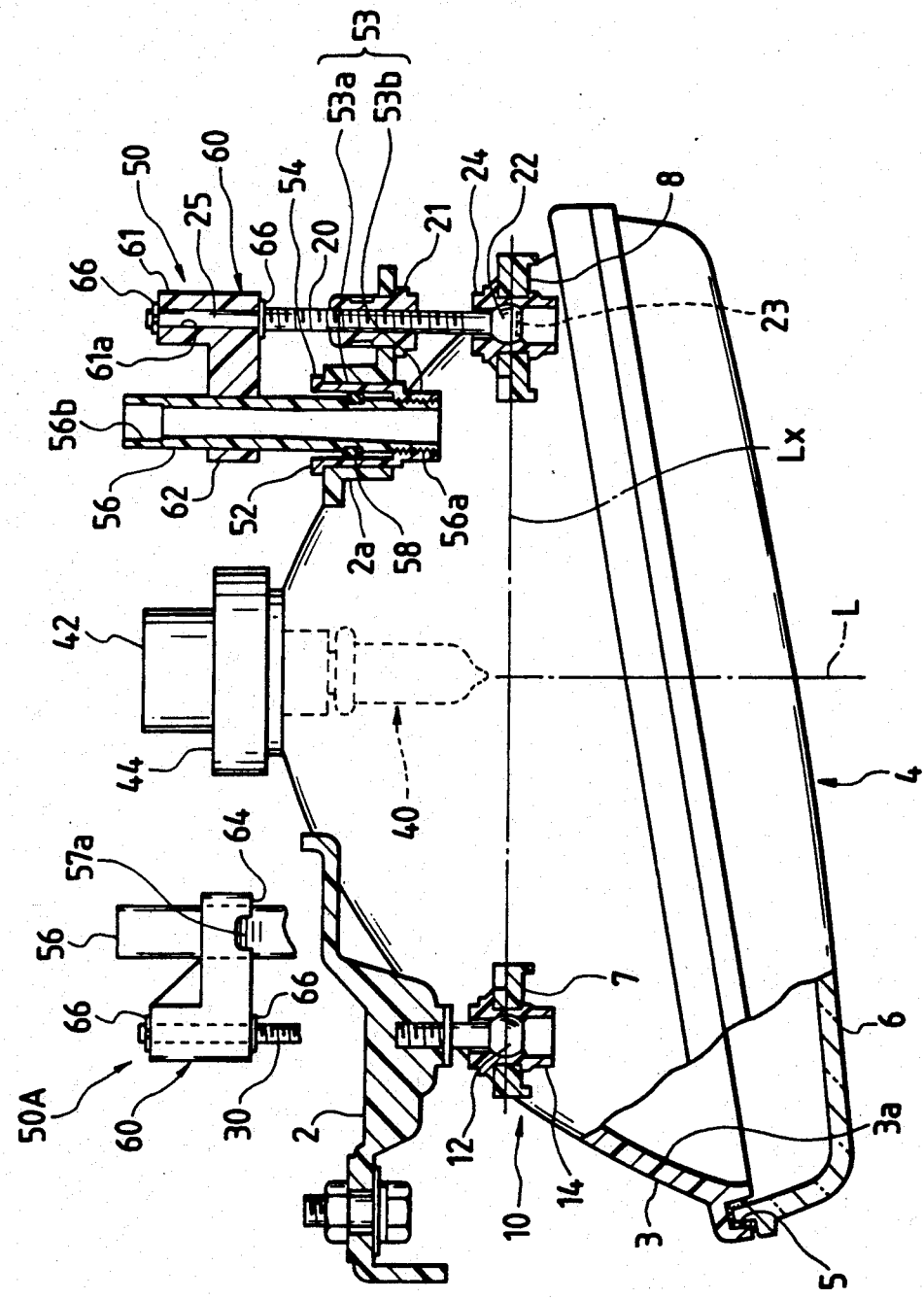
FIG. 2 is a horizontal sectional view (taken along a line II—II in FIG. 1) of the headlamp.
Figure 3:
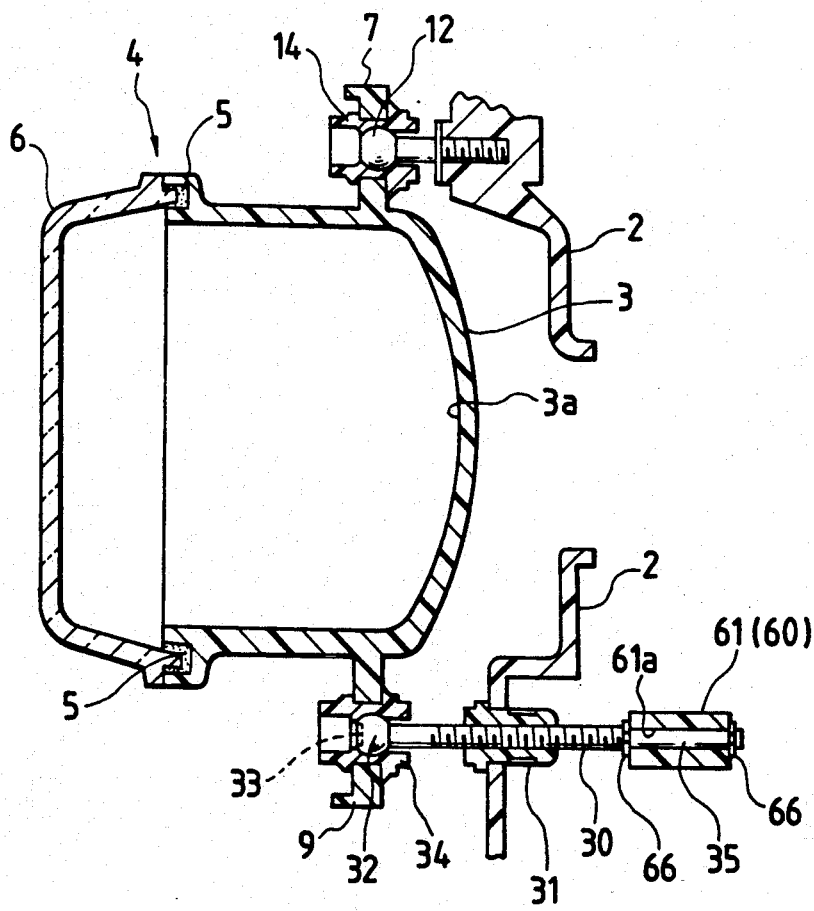
FIG. 3 is a vertical sectional view (taken along a line III—III in FIG. 1)
Figure 4:
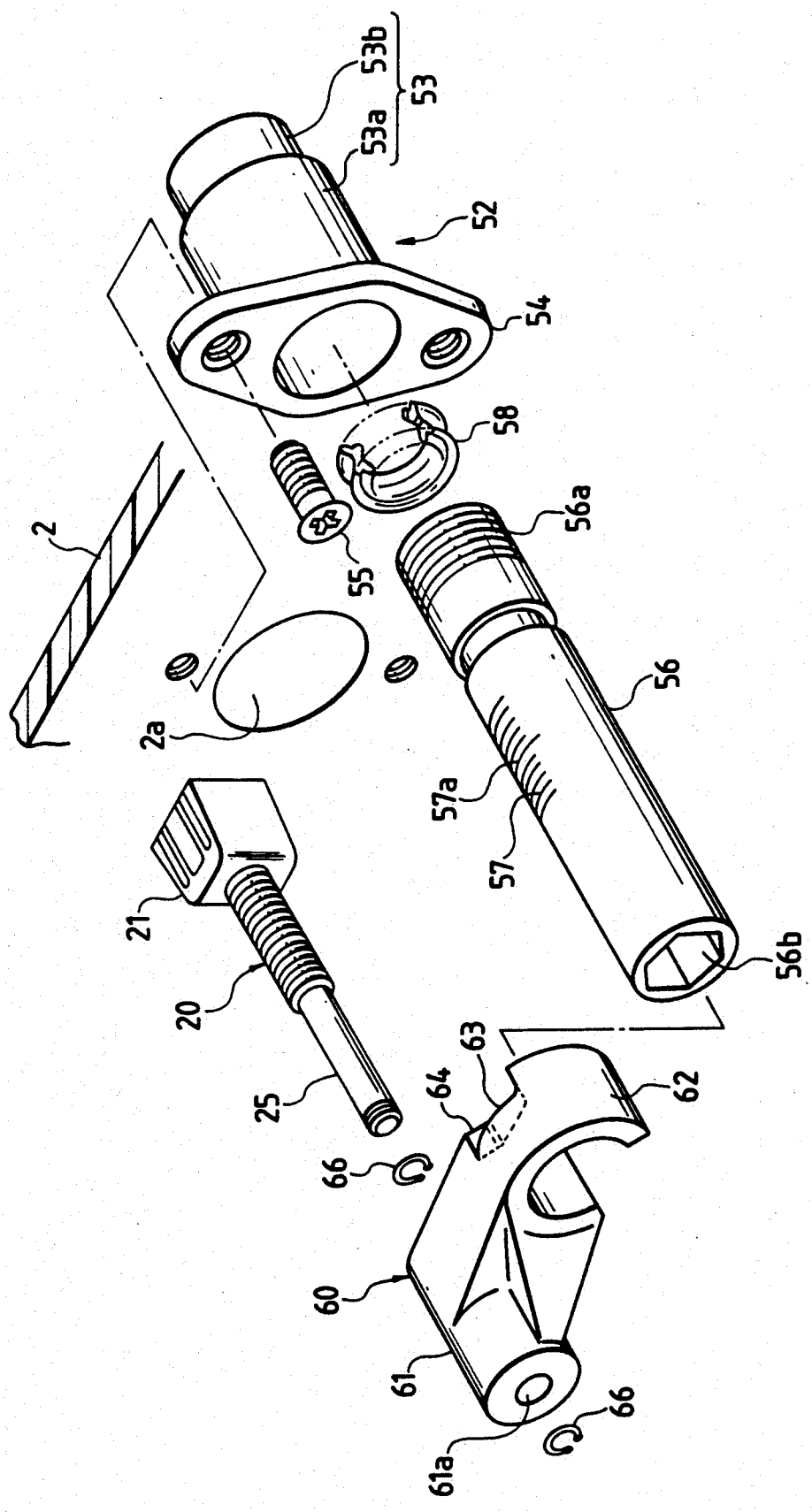
FIG. 4 is an exploded perspective view showing an example of a first inclination measuring unit shown in FIG. 1.

FIGS. 1 through 4 shows an example of a movable unit type headlamp employing a lamp body as a reference member and a lamp-body reflector unit as an inclination member and to which the technical concept of the invention is applied. FIG. 1 is a front view of the movable unit type headlamp with inclination measuring units. FIG. 2 is a horizontal sectional view of the headlamp (taken along line II—II in FIG. 1). FIG. 3 is a vertical sectional view of the headlamp (taken along line III—III in FIG. 1). FIG. 4 is an exploded perspective view showing an inclination measuring unit for measuring the angle of irradiation, in a horizontal plane, of the headlamp.

In these figures, reference numeral 4 designates a container-shaped unit composed of a lamp body 3 and a reflector 3a formed on the inner wall of the lamp body 3. A front lens 6 is engaged with the front opening of the unit 4. More specifically, the rim of the front lens 6 is engaged through sealing agent with a sealing groove 5 formed in the edge portion of the front opening of the unit 4. A light bulb 40 fitted in a bulb socket 42 is fixedly connected to the unit 4 by inserting the bulb 40 into a bulb inserting hole formed in the rear end wall of the unit 4 and fixing the bulb socket 42 to the bulb inserting hole with a locking cap 44.

The unit 4, as shown in FIGS. 1 through 3, is supported, at three points, by a ball joint 10, a horizontal aiming screw 20 and a vertical aiming screw 30 in front of the housing 2. The ball 12 of the ball joint 10 is fixedly supported on the side of the housing 2. More specifically, a ball holding socket 14 engaging the ball 12 is fixedly fitted in a bracket 7 protruding above the unit 4 so that the unit 4 is swingable about the ball joint 10. The aiming screws 20 and 30 are threadably supported by screw supporting nuts 21 and 31, respectively, which are fixedly fitted in the housing 2. The front end portions of the aiming screws 20 and 30 are formed into ball-shaped heads 22 and 32, respectively. The ball-shaped heads 22 and 32 are engaged with ball holding sockets 24 and 34, which are fixedly fitted in respective brackets 8 and 9 protruding from the unit 4. That is, the ball-shaped heads 22 and 32 and the ball holding sockets 24 and 34 form corresponding ball joints. An adjusting tool engagement structure, such as a slot for permitting engagement with a screwdriver, is formed in the each of the heads 22 and 32 of the aiming screws 20 and 30 so that the aiming screws 20 and 30 can be turned from the front of the headlamp. When turned, the aiming screws 20 and 30 are moved back and forth with respect to the nuts 21 and 31, and accordingly the ball holding sockets 24 and 34 on the unit which are engaged with the ball-shaped heads 22 and 32 of the screws 20 and 30 are moved back and forth with the respective screws, thereby to change the angle of inclination of the unit.

The unit supporting point of the horizontal aiming screw 20 (i.e., the engaging point of the ball-shaped head 22 of the aiming screw 20 and the ball holding socket 24 on the unit) is on the horizontal axis $L_x$, which is perpendicular to the axis L of irradiation of the headlamp (see FIG. 2) and passes through the ball joint 10, while the unit-supporting point of the vertical aiming screw 30 (i.e., the engaging point of the ball-shaped head 32 of the aiming screw 30 and the ball holding socket 34 on the unit 4) is on the vertical axis $L_y$, which is perpendicular to the axis L of irradiation of the headlamp and passes through the ball joint 10. Hence, when turned, the aiming screw 20 is moved back and forth with respect to the housing 2 so that the unit 4 is swung about the vertical axis $L_y$. Thus, the inclination in a horizontal plane of the inclination member, namely, the unit 4, with respect to the housing 2 (the reference member), that is, the angle of irradiation in a horizontal plane of the headlamp, can be adjusted. On the other hand, the aiming screw 30 is moved back and forth with respect to the housing 2 when turned so that the unit 4 is swung about the horizontal axis $L_x$ perpendicular to the vertical axis $L_y$. Thus, the inclination in a vertical plane of the inclination member, namely, the unit 4 with respect to the housing 2 (the reference member), namely, the angle of irradiation in a vertical plane of the headlamp, can be adjusted. Thus, the inclination of the unit 4, and hence the angle of irradiation of the headlamp, can be adjusted by operating the two aiming screws 20 and 30.

Reference numeral 50 designates a first inclination measuring unit, which is coupled to the rear end portion of the horizontal aiming screw extending rearward of the housing 2, which is employed to measure the deviation in the angle of inclination in a horizontal plane of the headlamp unit, i.e., the angle of irradiation in a horizontal plane of the headlamp. The first inclination measuring unit 50 is shown in FIGS. 2 and 4 in detail.

The first inclination measuring unit 50 includes a guide member 56 which is supported by the housing 2 and extends rearward of the housing 2 parallel to the aiming screw 20, and a slide member 60 mounted on the rear end portion of the aiming screw 20 and slidable on the guide member 56. A reference line 64 is formed on the slide member 60, and a scale 57 is marked on the guide member 56.

The housing 2 has a cylindrical part 2a near its aiming screw supporting point. A base member 52 is fixedly inserted into the cylindrical portion 2a. The base member 52 is composed of a cylindrical portion 53 inserted into the cylindrical part 2a and a flange 54 extending from the base end of the cylindrical portion 53 perpendicular to the axis of the base member 52. The cylindrical portion 53 is made up of a large-diameter portion 53a and a small-diameter portion 53b. The flange 54 is fixedly secured to the rear wall of the housing. The inner cylindrical wall of the small-diameter portion 53b of the base member 52 is female threaded. The female-threaded small-diameter portion 53b is engaged with the end portion of the guide member 56, which is male-threaded. The guide member 56 extends rearward through the large-diameter portion 53a of the base member 52, and the extension of the guide member 56 has an engaging recess 56b with which a guide member turning tool can be engaged. The guide member 56 moves back and forth inside the cylindrical portion 53 of the base member 52.

An annular bushing X-shaped in section is fitted on the guide member 56, thus increasing the frictional torque of the guide member 56 and the large-diameter portion 53a of the base member 52. Hence, even if the guide member 56 is touched in error, it cannot be readily turned.

The rear end portion of the aiming screw 20 includes a straight portion 25 which is not threaded. The slide member 60 is coupled to both the straight portion 25 and the guide member 56. The slide member 60 is made up of a cylindrical portion 61 having formed therein a cylindrical hole 61a into which the straight portion 25 is inserted, and a holding portion 62 C-shaped in section integral with the cylindrical portion 61. The holding portion 62 is slidably mounted on the cylindrical outer wall of the guide member 56. The holding portion 62 has an opening 63 whose side edges are chamfered. The reference line 64 for the scale 57 is provided on the edge portion of one side of the opening 63.

When the aiming screw 20 is turned, it is moved back and forth with respect to the nut 21 engaged therewith so that the slide member is slid back and forth along the guide member 56. That is, the rotation of the aiming screw 20 is transmitted, as linear motion, to the slide member 60. Hence, the amount of movement in a horizontal plane of the unit 4 (i.e., the amount of inclination thereof about the vertical axis $L_y$) is indicated as an amount of movement of the slide member 60 on the scale. Therefore, by setting the reference point 64 to the zero point 57a of the scale 57 in advance (which operation is referred to as a zero point adjustment), the degree of inclination in a horizontal plane of the unit 4 can be read from the scale 57. The zero point adjustment is carried out by turning the guide member 56 to move in and out of the base member 52 until the zero point 57a reaches the reference point 64 of the slide member.

An example of a procedure for coupling the first inclination measuring unit 50 to the aiming screw 20 will now be described with reference to FIG. 4.

First, the aiming screw 20 is engaged with the nut 21 secured to the housing 2 so that the screw 20 protrudes rearward of the housing 2. Next, the guide member 56 with the bushing 58 is threadably engaged with the base member 52. The cylindrical portion 53 of the base member 52 is inserted into the cylindrical part 2a of the housing 2, and then the flange 54 of the base member 52 is secured to the housing 2 with screws 55. Under this condition, the slide member 60 is coupled to both the straight portion 25 of the aiming screw 20 and the guide member 56, and C-rings 66 and 66 are fitted on the straight portion 25 of the aiming screw 20 to prevent the slide member 60 from coming off from the aiming screw 20. Thus, the first inclination measuring unit 50 has been coupled to the aiming screw 20.

In FIG. 2, 50A designates a second inclination measuring unit for measuring the amount of deviation in inclination of the unit 4 in a vertical plane, that is, deviation in the angle of irradiation of the headlamp in a vertical plane. The second inclination measuring unit 50A is equivalent in structure to the above-described first inclination measuring unit 50, except that it is coupled to the rear end portion of the aiming screw 30 which protrudes rearward of the housing 2. Therefore, in FIG. 2, components corresponding functionally to those of the first inclination measuring unit are designated by the same reference numerals or characters.

The second inclination measuring unit 50A operates as follows: When the aiming screw 30 is turned, it is moved back and forth with respect to the nut 31 engaged therewith so that the slide member 60 is slid along the guide member 56. As a result, the amount of movement in a vertical plane of the unit 4 (i.e., the amount of inclination about the horizontal axis $L_x$) is indicated as an amount of movement of the reference point 64 of the slide member 60 on the scale. Hence, with the zero point adjustment made in advance, the degree of inclination in a vertical plane of the unit 4 can be detected.

Procedures for adjusting the first and second inclination measuring units 50 and 50A to be carried out when the headlamp is installed on the vehicle, and a procedure for adjusting the angle of irradiation of the headlamp to be carried out thereafter, will be described.

During manufacture, the headlamp is set so that, when, in the first inclination measuring unit 50, the reference point 64 is at the zero point 57a of the scale 57, the angle of irradiation in a horizontal plane of the headlamp is suitable, and similarly when, in the second inclination measuring unit 50A, the reference point 64 is at the zero point 57a, the angle of irradiation in a vertical plane of the headlamp is acceptable. However, when the headlamp with the first and second inclination measuring units 50 and 50A is installed on the vehicle body, the indications on the scales of the units 50 and 50A may shift from the correct values because of various errors and manufacturing tolerances. Hence, it is essential to carry out adjustment of the units 50 and 50A. An example of such a zero point adjusting method for the scales will be described.

First, the vehicle is set in a horizontal plane, a light screen is set in front of the vehicle, and the headlamp is turned on. Under this condition, the vertical aiming screw 30 and the horizontal aiming screw 20 are turned until the light distribution of the headlamp is at a predetermined position in both a vertical direction and in a horizontal direction. In this case, the reference point 64 may not be at the scale zero point 57a, for instance, because of variations in the lamp mounting surface of the vehicle body. This may be corrected by moving the guide members 56 of the first and second inclination measuring units back and forth with respect to the slide members 60 by turning them until the scale zero points 57a are at the reference points 64.

Thereafter, the user can adjust the angle of irradiation of the headlamp as necessary. If the amount of inclination in a horizontal or vertical plane of the unit 4, i.e., the angle of irradiation in a horizontal or vertical plane of the headlamp, deviates from the correct value, the reference point 64 will be shifted from the scale zero point 57a on the first or second inclination measuring unit 50 or 50A. This deviation can be read from the amount of shift of the reference point from the scale zero point. In this case, the aiming screw 20 or 30 is turned until the reference point 64 reaches the scale zero point 57a. Thus, the angle of irradiation in a horizontal or vertical plane of the headlamp can be adjusted with ease.

Figure 5:
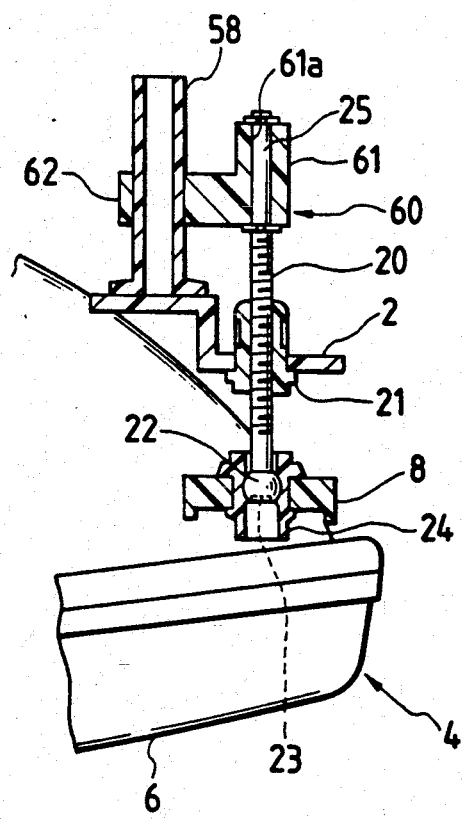
FIG. 5 is a horizontal sectional view showing essential components of another example of the first inclination measuring unit.
Figure 6:
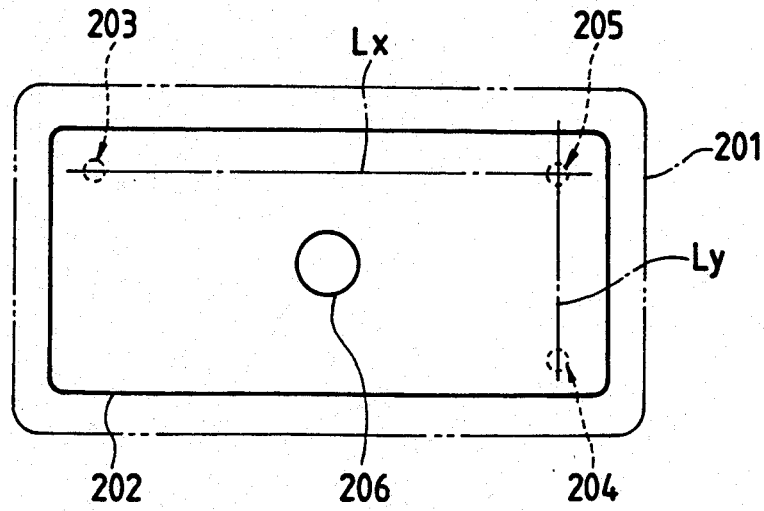
FIG. 6 is an explanatory diagram for a description of a reflector supporting structure in a movable reflector type headlamp.

In each of the above-described inclination measuring units 50 and 50A, the guide member 56 is threadably engaged with the base member 52 secured to the housing 2, and the scale zero point adjustment is achieved by turning the guide member 56. However, the inclination measuring unit may also be designed so that, as shown in FIG. 5, the guide member 56 is secured directly to the housing 2. However, in this case, it should be noted that the scale zero point adjustment cannot be carried out freely, and therefore it is necessary that, when the angle of irradiation of the lamp is correct, a mark is put on the scale in alignment with the reference point.

Figure 7:
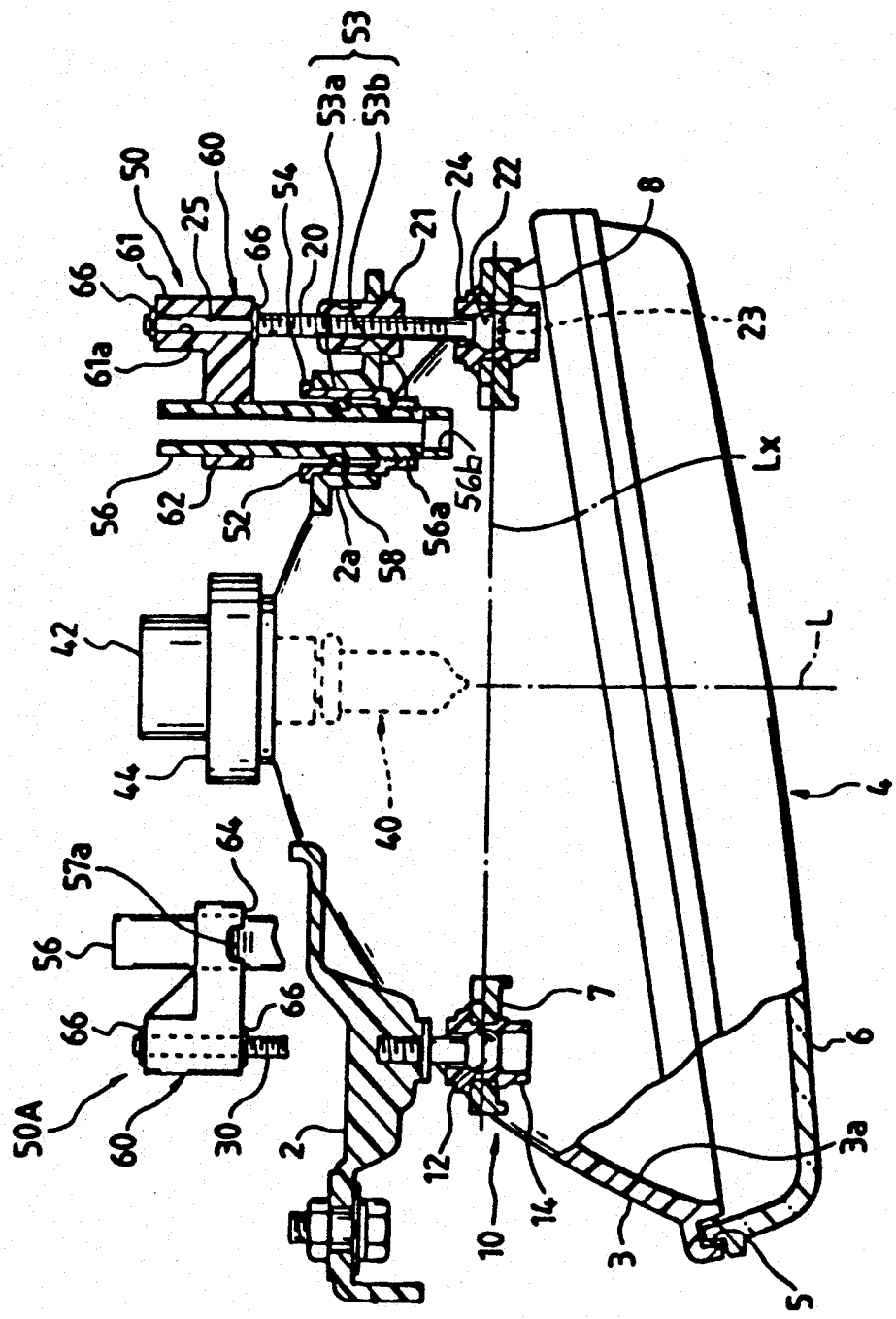
FIG. 7 is a view similar to FIG. 2 showing a modification of the invention.

In the above-described embodiment, the turning member, namely, the engaging recess 56b, is formed in the end portion (behind the housing) of the guide member. That is, the zero point adjustment is carried out by manually turning the guide member 56 by hand from the rear of the housing. However, as shown in FIG. 7, the inclination measuring unit may be designed so that the front end portion of the guide member 56 extends forwardly in such a manner that it does not interfere with the bracket 8 on the side of the unit, and an engaging recess for the guide member turning tool is formed in the front end portion so that the turning of the guide member, that is, the scale zero point adjustment, can be carried out from the front of the headlamp.

Figure 8:
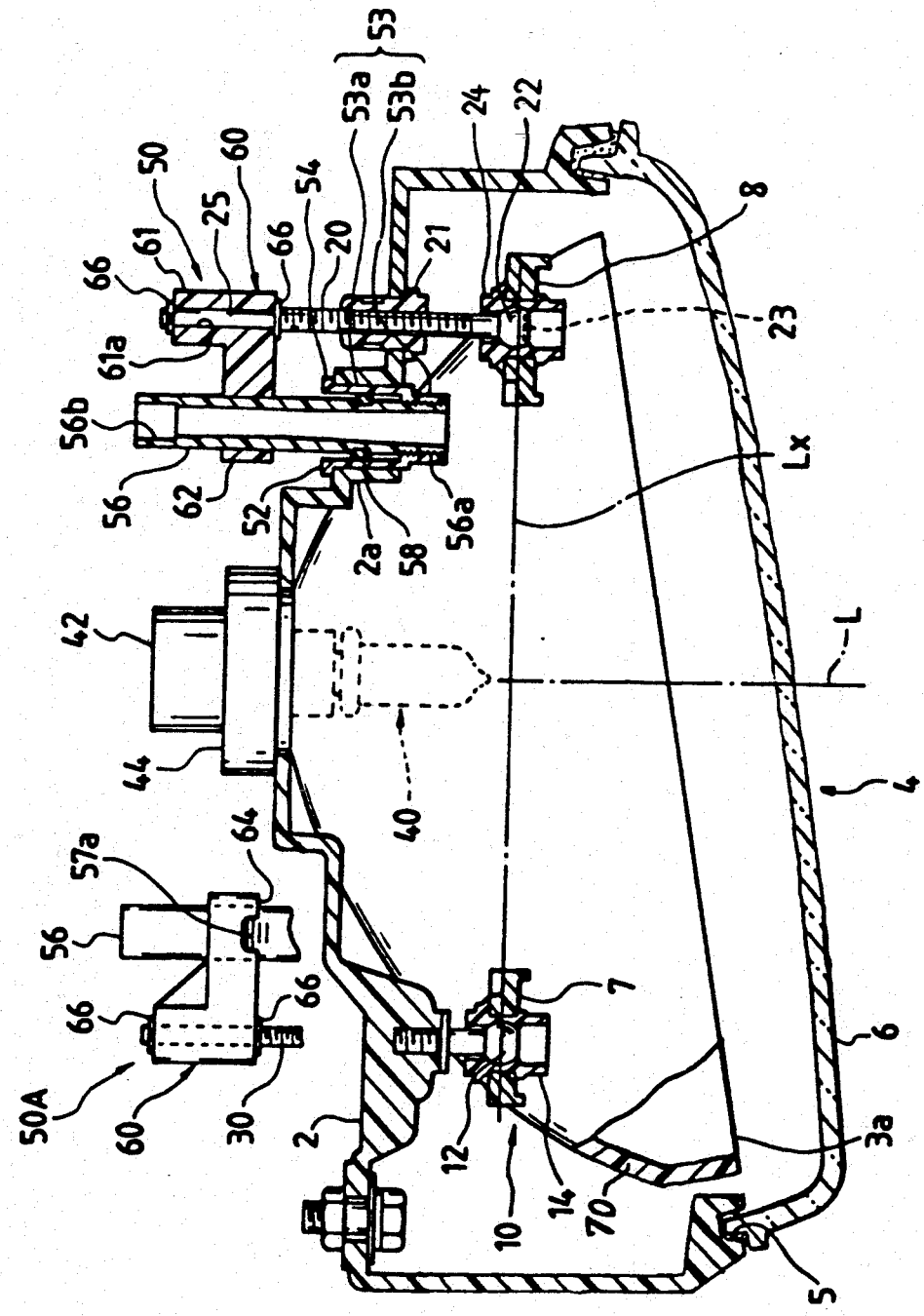
FIG. 8 is a horizontal sectional view of a movable reflector type headlamp of the invention.

Two embodiments of the invention have been described with reference to a movable unit type headlamp; however, the invention is not limited thereto or thereby. That is, the technical concept of the invention can be applied to a movable reflector type headlamp in which the lamp body is the reference member and the reflector is the inclination member. Such an arrangement is depicted in FIG. 8. Reference numerals appearing commonly in FIG. 8 and the preceding drawings depict like elements. Further in FIG. 8, reference numeral 70 denotes a movable reflector.

As described above, with each of the inclination measuring units according to the invention, the inclination of the inclination member (the reflector in the case of a movable reflector type headlamp and the lamp-body reflector unit in the case of a movable unit type headlamp) with respect to the reference member (the lamp body in the case of the movable reflector headlamp and the lamp housing in the case of the movable unit type headlamp) can be read from the deviation of the indication on the scale of the unit interposed between the aiming screw and the reference member; that is, the deviation in inclination of the inclination member, and hence the deviation in the angle of irradiation of the headlamp, can be read from the difference in indication on the scale.

In order to adjust the angle of irradiation of the headlamp, the angle of inclination of the inclination member is adjusted by turning each of the aiming screws until the scale indicates the predetermined value. Thus, the angle of irradiation of the headlamp can be adjusted with ease and without special training or special tools.

Each of the inclination measuring units is provided between the rear end portion of one of the aiming screw and the reference member. Hence, with the inclination measuring units of the invention, unlike the conventional case, it is unnecessary to perform a machining operation so as to form holes in the reference member for installation of the units.

The inclination measuring units are arranged behind the reference member. Therefore, particularly in a movable reflector headlamp, the scale can be read with ease. In addition, the resultant headlamp is small in height; that is, a headlamp reduced in height can be provided according to the invention. Furthermore, when the headlamp is installed on the vehicle body, the required installation space in the vertical direction is small.

Moreover, since the zero point adjustment of the scale can be achieved by turning the guide member, the angle of irradiation of the headlamp can be adjusted with ease.

What is claimed is:

1. A vehicular headlamp of movable inclination member comprising:

an inclination member having a light reflecting surface for establishing a direction of irradiation of said vehicular headlamp;

a reference member;

a supporting structure for supporting said inclination member on said reference member at three points of said inclination member, said supporting structure comprising a swinging fulcrum supported on said reference member, and a horizontal aiming screw and a vertical aiming screw penetrating said reference member and extending parallel to a horizontal axis of said vehicular headlamp and supported by said reference member, said horizontal and vertical aiming screws being turned to adjust an angle of inclination of said inclination member in a horizontal plane and in a vertical plane, respectively, said horizontal and vertical aiming screws being threadably engaged with female-threaded members provided on the side of said reference member, and having supporting portions for supporting said inclination member, said supporting portions each comprising a ball joint; and horizontal and vertical inclination measuring units provided between said reference member and rear end portions of respective ones of said horizontal and vertical aiming screws which protrude rearward of said reference member, each of said horizontal and vertical inclination measuring units comprising:

a guide member supported by said reference member and extending substantially parallel to said rear end portion of the respective aiming screw;

a slide member supporting on a straight portion forming a part of said rear end portion of said respective aiming screw, and coupled to said guide member in such a manner that said slide member is slidable back and forth along said guide member; and a scale provided on at least one of said guide member and slide member, for indicating an amount of displacement of said inclination member with respect to said reference member.

2. The vehicular headlamp as claimed in claim 1, wherein said reference member comprises a lamp housing, and said inclination member comprises a lamp-body reflector unit comprising a lamp body and a reflector formed integrally on an inner surface of said lamp body.

3. The vehicular headlamp as claimed in claim 1, wherein said reference member comprises a lamp body, and said inclination member comprises a reflector which can be tilted inside said lamp body.

4. The vehicular headlamp as claimed in claim 1, wherein said guide member is rotatable relative to said slide member, said guide member being turned to perform zero point adjustment of said scale.

5. The vehicular headlamp as claimed in claim 4, wherein said guide member is threadably engaged with a member integral with said reference member.

6. The vehicular headlamp as claimed in claim 5, wherein said reference member comprises a cylindrical portion and a base member inserted into said cylindrical portion, said guide member being threadably engaged with said base member.

7. The vehicular headlamp as claimed in claim 6, wherein said base member comprises a small-diameter portion and a large-diameter portion, an inner cylindrical wall of said small-diameter portion being female-threaded and threadably engaged with said guide member.

8. The vehicular headlamp as claimed in claim 7, further comprising an annular bushing fitting in said large-diameter portion to restrain rotation of said guide member.

9. The vehicular headlamp as claimed in claim 1, wherein said slide member comprises a cylindrical portion having a cylindrical hole therein rotatably fitted over said straight portion of said rear end portion of said aiming screw, and a C-shaped holding portion slidably fitted on a cylindrical outer wall of said guide member.

10. The vehicular headlamp as claimed in claim 9, wherein edge portions of said C-shaped holding portion are chamfered.

11. The vehicular headlamp as claimed in claim 1, wherein an engaging recess is formed in a rear end portion of said guide member for engaging with an adjusting tool.

12. The vehicular headlamp as claimed in claim 1, wherein a front end portion of said guide member extends forwardly, and an engaging recess for engaging with an adjusting tool is formed in said front end portion.

* * * * *